United States Patent

Worthington

[11] 3,957,109
[45] May 18, 1976

[54] SOLAR COLLECTOR — HEAT EXCHANGER

[76] Inventor: Mark N. Worthington, 10227 White Mountain Road, Sun City, Ariz. 85351

[22] Filed: Oct. 31, 1974

[21] Appl. No.: 519,521

[52] U.S. Cl. .................................. 165/48; 165/60; 237/1 A; 62/304; 62/259
[51] Int. Cl.² .................................... F25B 29/00
[58] Field of Search ................ 165/48, 137, 58, 60; 237/1 A; 62/304, 310, 259

[56] References Cited
UNITED STATES PATENTS

| | | | |
|---|---|---|---|
| 2,601,905 | 7/1952 | Anderegg | 126/270 |
| 2,660,863 | 12/1953 | Gerhart | 62/310 |
| 3,254,701 | 6/1966 | Thomason | 165/48 |
| 3,894,685 | 7/1975 | Keyes et al. | 237/1 A |

Primary Examiner—Albert W. Davis, Jr.
Assistant Examiner—James D. Liles
Attorney, Agent, or Firm—John A. Robertson

[57] ABSTRACT

A solar heating and cooling system comprising a double tiered solar collector and heat exchanger that is mounted on a roof at an angle ranging from 30° to 45° with respect to the horizontal, with its upper surface being blackened. Each tier of the heat exchanger includes a series of longitudinal channels, there being upper and lower manifolds communicating with all of the channels. A duct depends from the middle of the upper channel and is connected to an air blower that takes air from the premises being heated or cooled. Another pair of ducts depend from the lower manifold at the opposite end thereof and discharge heated air into the premises. A heat trap in the form of a transparent plastic sheet is removably mounted above the collector and heat exchanger in close proximity thereto.

12 Claims, 6 Drawing Figures

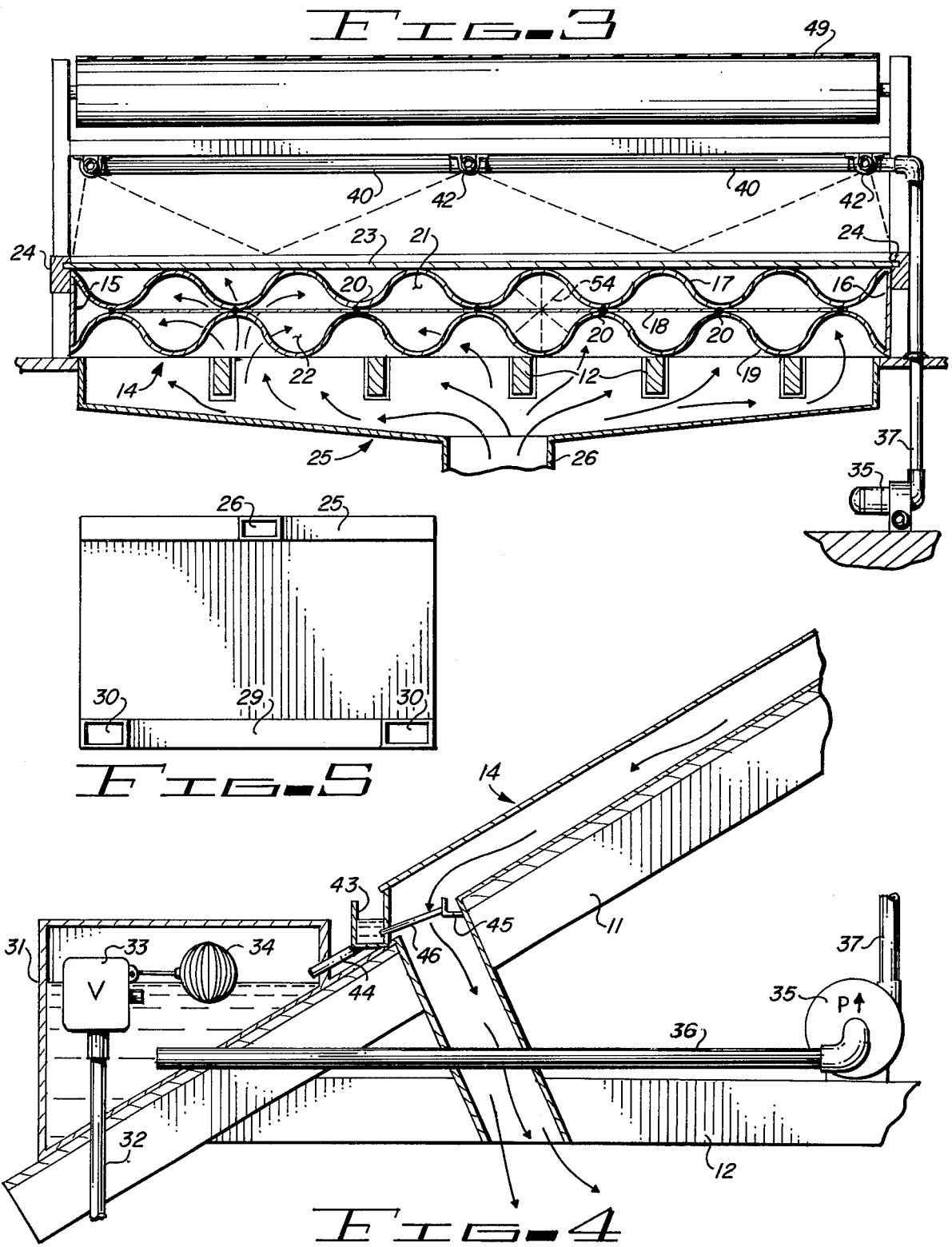

SOLAR COLLECTOR — HEAT EXCHANGER

When used for cooling the heat trap is removed and spraying apparatus mounted above the heat exchanger is brought into operation. The spraying apparatus comprises a water sump at the lower end of the heat exchanger which receives water from a supply source and water that has been sprayed onto the upper surface of the exchanger. A conduit extends from the sump to a water pump. From the latter a pipe extends upwardly to a plurality of perforated tubes located above and in spaced relation to the heat exchanger. In operation, water is sprayed onto the upper surface of the exchanger and indirectly cools air passing therethrough by evaporation. A flexible sunshade in roll form is mounted transversely of the heat exchanger at the upper end and is pulled down into effective position when the system is used for cooling purposes. This sunshade is retracted when the system is used for heating or nocturnal radiation cooling.

Humidifying apparatus is also provided and used as occasion demands. It introduces small drops of water into the lower tier of channels at the upper ends thereof. Provision is made to pass any excess humidifying water to the sump.

The present invention relates to solar heating and cooling systems and is concerned primarily with such a system in which air is indirectly cooled by the evaporation of water that is sprayed onto the upper surface of a solar collector and heat exchanger.

BACKGROUND OF THE INVENTION

At the present time the country is confronted with an energy crisis that has been emphasized by the limitation on the import of petroleum imposed by the Arab Nations. This crisis has resulted in great activity by inventors, engineers and research workers to the end of providing heating and cooling systems which derive their operative energy from the sun. Considerable activity existed in this field before this crisis.

The known art includes several examples of heating devices which use solar energy. Some of the known systems of this type include means for cooling air in the premises in which the systems are installed. In many, if not all of such systems which include air cooling means, the air is cooled by spraying water directly into the air. Such arrangements have proven to be generally unsatisfactory and not acceptable to the using public for any of several reasons, among which may be noted the problem of excess humdity in the treated air which is not compatible with human comfort. It may be stated with a high degree of assurance that the known art is notably lacking in a solar heating and cooling system in which air is indirectly cooled by the evaporation of water.

The known art is also lacking in a system of the type noted in which provision is made for nocturnal radiation cooling that includes no water spraying or the use of any water.

There are now known many heat exchangers of various types. One such type which is widely known, comprises a corrugated or grooved sheet of metal together with a flat sheet that closes the open sides of the corrugations or grooves. Known heat exchangers of this type are not effective or efficient to the degree required for a solar energy heating and cooling system of the character with which this invention is concerned.

Solar heating and cooling systems now available to the public are expensive and costly to install. The costs attending their installations are so high as to discourage their acceptance. Moreover, even though the energy crisis should worsen an appreciable degree, the cost discrepancy between using conventional sources of energy and solar energy would still be so great as to prohibit the use of known solar energy systems. The present invention is founded on the belief that the system of this invention will be found to be practical, cost saving, and acceptable with present energy cost levels and even more so as energy costs increase.

OBJECTS OF THE INVENTION

With the foregoing conditions in mind, the present invention has in view the following objectives:

1. To provide an efficient solar heating and cooling system.
2. To provide, in a system of the type noted, a new improved and highly effective solar collector and heat exchanger.
3. To provide, in a system of the character aforesaid, air cooling apparatus that cools air indirectly by the evaporation of water.
4. To provide a system of the kind described which may be easily converted from heating to cooling.
5. To provide, in a system of the type noted, apparatus for noctural radiation cooling which does not require the use of water.
6. To provide, in a system of the character aforesaid, means for humidifying air as occasion demands.
7. To provide in a system of the kind described which includes a humidifier, apparatus for accommodating excess humidification water.

Various other more detailed objects and advantages of the invention, such as arise in connection with carrying out the above ideas in a practical embodiment, will, in part, become apparent, and, in part, be hereafter stated as the description of the invention proceeds.

SUMMARY OF THE INVENTION

The foregoing objects are achieved by providing a solar heating and cooling system which includes as a characteristic and essential element a solar collector and heat exchanger. This exchanger is rectangular in shape and is mounted on the roof of the premises to be heated or cooled at an angle ranging from 30° to 45° and facing the equator. The exchanger presents two tiers of channels provided by an upper corrugated or grooved sheet of metal, the upper exposed surface of which is blackened; an intermediate flat sheet of metal secured to the convolutions of the upper sheet to close the corrugations or grooves therein; and a lower corrugated or grooved metallic sheet secured to the flat intermediate sheet so that the upwardly opening corrugations or grooves are closed by the intermediate sheet. The channels defind by the corrugated and flat sheets extend longitudinally, that is, with a vertical component, speaking with reference to the slope at which the exchanger is mounted.

An upper manifold communicates with the upper ends of the channels of both tiers. A duct depends from the midpoint of the upper manifold and extends to an air blower which is located in the premises on which the exchanger is mounted and draws air from these premises and blows such air into the upper ends of the channels.

A lower manifold extends transversely of the lower ends of the channels and communicates with the channels of both tiers. A duct depends from each end of the lower manifold and extends into the premises. A heat trap for the exchanger is provided in the form of a transparent plastic sheet that is removably mounted on the exchanger immediately above the upper corrugated sheet.

The structure so far described constitutes the essential elements of the system when used for heating. Air is withdrawn from the premises by the blower and forced into the upper ends of the heat exchanger channels via the manifold. As it flows downwardly through the channels, it is heated by the energy derived from the sun rays striking the blackened upper surface of the top corrugated sheet of the exchanger. Heat is transmitted by conduction through the upper sheet and intermediate sheet to the lower sheet and hence heats air in the channels of the lower tier.

A water sump is mounted on the roof just below and at one end of the exchanger. This sump receives water from an appropriate source of supply and also from a main transverse trough that is located just below the lower end of the upper corrugated sheet. Water in the sump is maintained at a constant level by a float controlled valve in the water supply line.

From the sump a conduit extends to a water pump. From the latter a pipe extends upwardly where it is connected to an arrangement of pipes that are spaced above the exchanger and formed with a plurality of small apertures through which water is sprayed onto the upper corrugated sheet when the heat trap is removed as it is for cooling purposes. Water so sprayed passes downwardly over the upper corrugated sheet and into the main trough.

A sunshade in the form of a flexible opaque sheet is rolled out a transverse spring-biased shaft above the upper end of the exchanger. This sunshade is retracted when the system is used for heating but is pulled down into position protecting the exchanger from the sun rays when the system is used for cooling. It is also retracted every evening for nocturnal evaporative and/or radiation cooling and pulled down every morning for evaporative cooling.

To humidify the air, when such is desirable, a transverse perforated tube is provided at the upper ends of the channels of the lower tier and connected to a suitable source of water under pressure. A small transverse trough is included in the lower manifold at the lower ends of the channels of the lower tier. This trough slopes slightly away from its center and at each end a small pipe extends from the small trough to the main trough. Hence, any excess of water supplied for but not used in humidifying, is passed down the channels of the lower tier into the small trough and then to the sump via the pipes at each end of the small trough and the main trough.

For a full and more complete understanding of the invention, reference may be had to the following description and the accompanying drawings wherein:

FIG. 3 is a transverse section taken on the plane of the line 3—3 of FIG. 1.

FIG. 4 is a fragmentary view, taken on an enlarged scale, and depicting the lower end of the heat exchanger, the sump, troughs and other elements associated therewith, and FIG. 5 is a diagrammatic bottom plan view of the heat exchanger and manifolds per se.

DESCRIPTION OF A PREFERRED EMBODIMENT

Figure 1:
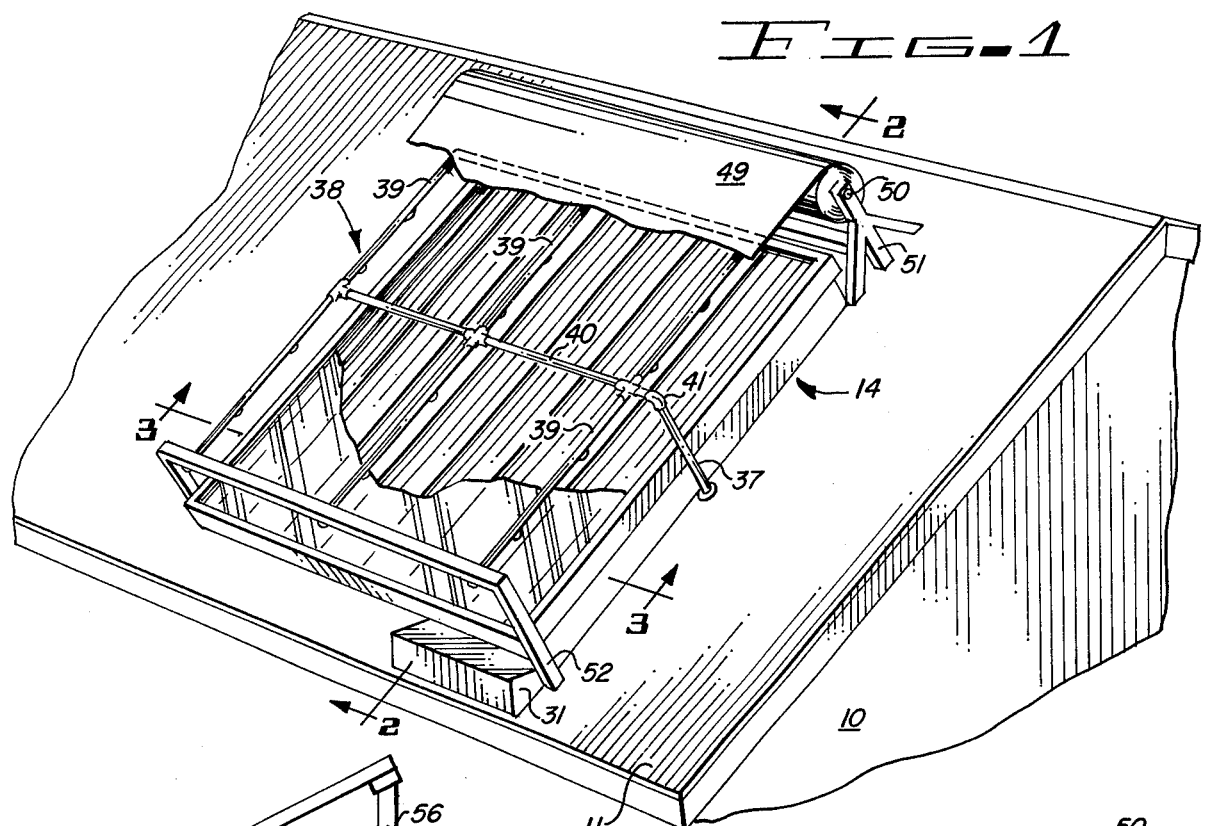
FIG. 1 is a perspective of a portion of roof with the heat exchanger and associated elements of the subject solar heating and cooling system of this invention mounted thereon.
Figure 2:
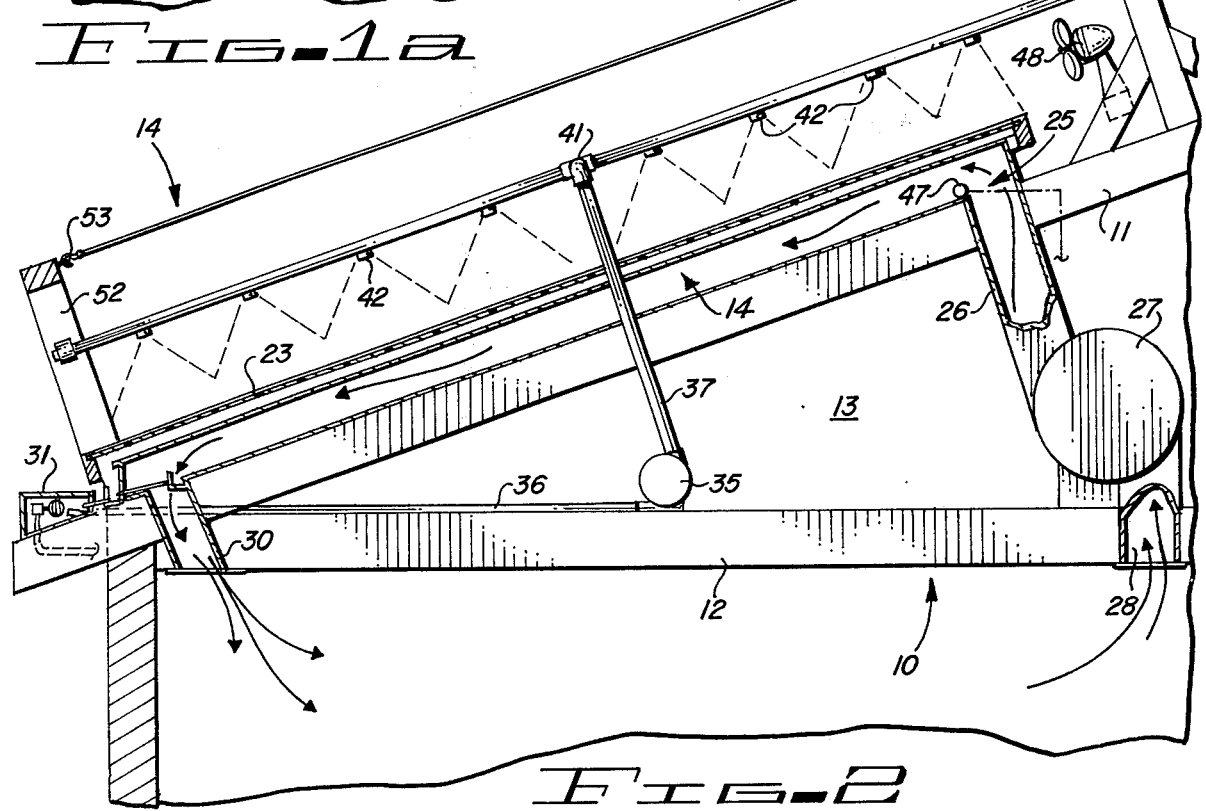
FIG. 2 is a side view, partially in section and partially in elevation, being taken on the plane of the line 2—2 of FIG. 1.

Referring now to the drawings, wherein like reference characters denote corresponding parts throughout the several views, and first more particularly to FIGS. 1 and 2, a portion of a house which is representative of premises that are adapted to have the air therein either heated or cooled by the solar system of the present invention is designated 10. House portion 10 includes a roof 11 which slopes at an angle and ceiling joists 12 which cooperate the roof 11 in defining attic space 13. The roof 11 should face the equator so as to derive maximum benefit from the rays of the sun.

Mounted on roof 11 is a solar collector and heat exchanger which is identified in its entirety by the reference character 14. Exchanger 14 is rectangular in shape and purely for exemplary purposes, it is noted it may have a transverse dimension of 12 feet and a longitudinal dimension of 10 feet. The latter has a vertical component caused by the slope of roof 11. It also may have a thickness of about 4 inches.

Referring now to FIG. 3, heat exchanger 14 comprises side walls 15 and 16 between which extend an upper corrugated metallic sheet 17, the exposed top surface of which is blackened; an intermediate flat sheet 18 and a lower corrugated metal sheet 19. The bottoms or bends of the corrugations in sheets 17 and 19 are secured to intermediate sheet 18 in any preferred manner as by the spot welds indicated at 20. Corrugated sheets 17 and 19 are preferred examples of metallic sheets that are formed with longitudinal grooves which open onto intermediate sheet 18. Sheets 17 and 18 cooperate to define an upper tier of channels 21 while sheets 18 and 19 define a lower tier of channels 22.

A heat trap which is removably mounted over heat exchanger 14 comprises a flat transparent sheet 23, of which plastic is an example, and side bars 24 and end bars (not illustrated). The latter overlap side pieces 15 and 16 when the heat trap is in effective position with sheet 23 in close proximity to outer bends of corrugated sheet 17.

An upper manifold is designated generally 25 and is mounted transversely on the upper end of exchanger 14 so as to communicate with the channels 21 and 22. Depending from the center of manifold 25 is a duct 26 which is connected at its lower end to an air blower 27 as shown in FIG. 2. Blower 27 is mounted on a joist 12 and has an inlet at 28 which withdraws air from premises 10.

Extending across the lower ends of channels 21 and 22 is a lower manifold depicted diagrammatically in FIG. 5 at 29. A duct 30 depends from each end of lower manifold 29 and extends into premises 10 into which it discharges heated air. The structures so far described are the elements which are essential to use of the system for heating. Certain additional structure and mechanism is required to adapt the system to cooling. These will now be described.

A water sump 31 is shown in FIGS. 1, 2, and 4 as mounted on roof 11 immediately below and at one end of exchanger 14. A pipe 32 enters sump 31 from the bottom and is connected to an appropriate water supply. A valve 33 is mounted on the upper discharge end of pipe 32 and is controlled by a float 34 to maintain the water in sump 31 at a desired constant level. A water pump 35 is mounted on a joist 12 and is connected to sump 31 by a pipe 36. Another pipe 37 (FIGS. 1 and 2) extends upwardly to an arrangement of spray pipes referred to in its entirety at 38. Pipe arrangement 38 comprises 3 longitudinal pipes 39 and a cross pipe 40 which is connected to and communicates with pipes 39 midway thereof with one end of pipe 40 being connected to the upper end of pipe 37 at 41. All of pipes 39 are formed with small apertures on their undersides to provide nozzles as indicated at 42 in FIG. 2. This water is sprayed onto upper corrugated sheet 17 of the heat exchanger when the heat trap is removed as it is during cooling.

A main trough or gutter 43, that is best shown in FIG. 4, is mounted transversely of exchanger 14 immediately below its lower end in which position water sprayed onto the top surface of corrugated sheet 17 runs down into gutter 43. A short conduit 44 extends from the bottom of gutter 43 to sump 31 whereby water in trough 43 is drained into sump 31.

A small trough or gutter 45 is mounted in lower manifold 29 close to the top corner where this manifold meets the lower tier of channels 22. This trough 45 has a raised center (not illustrated) and slopes towards its opposite ends at small angles to the horizontal. A pair of tubes 46 at opposite ends of trough 45 drain water from the latter and pass such water into main trough 43.

It is recognized that under certain climatic conditions it may be desirable to humidify air that passes through heat exchanger 14. This condition may obtain when the air is to be heated or cooled. Upon referring to FIG. 2, a small transverse tube 47 is mounted in upper manifold 25 at the corner where channels 22 meet duct 26. Tube 47 is perforated to provide a series of small openings (not illustrated) through which water drips into the upper ends of the channels 22. Tube 47 is connected to a source of water under pressure in a well-known manner. Such water sources are well-known and hence are not herein illustrated.

When the system is used for cooling, water evaporated from contact with upper sheet 17 will cool the air immediately above this sheet. Being cooled it will exhibit a tendancy to flow downwardly towards the lower end of the exchanger 14. However, to insure of such a draft of air, a motor driven fan 48 may be mounted on roof 11 above the upper end of exchanger 14.

A flexible sunshade 49 is assembled in roll form on a shaft 50 which is spring-biased to retract sunshade 49. Shaft 50 is mounted on structure designated generally 51 which upstands from roof 11 above heat exchanger 14. After being pulled downwardly, sunshade 49 is secured in protective position in any well-known manner such as by being secured to an inverted U-shaped member 52 upstanding from roof 11 at the lower end of exchanger 14. This anchorage is indicated at 53. The top surface of sunshade 49 is white or silvered so as to reflect sun rays and maintain the temperature of air therebeneath at a low degree.

It will be understood that the term "heat exchanger" as herein used to identify the assembly 14 is synonymous with a solar collector and heat exchanger, as it in the first instance collects solar energy, and then transmits the heat of such energy.

It is notable that plastic sheet 23 is transparent and functions as a heat trap by preventing re-radiation of infra red rays.

Also, while not illustrated, it will be understood that the under surfaces of heat exchanger 14, manifolds 25 and 29, ducts 26 and 30 and blower 27 will be insulated to prevent the loss of heat when heating and the gain of heat while cooling.

Figure 1A:
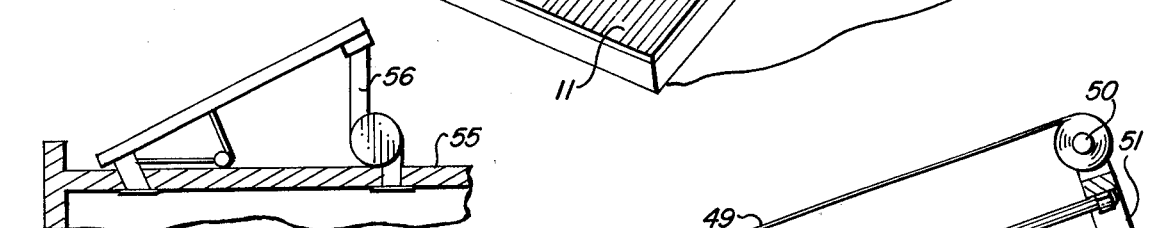
FIG. 1a is a perspective, somewhat diagrammatic, illustrating the subject system as mounted on a flat roof.

FIG. 1a illustrates how the apparatus of the instant system may be installed on a flat roof. This roof is shown at 55 and support structure 56 replaces the structure 51 of FIGS. 1 and 2. Otherwise the structure arrangement is substantially the same as that illustrated and described in conjunction with FIGS. 1 to 5.

Before describing the mode of operation of the above described system, it is noted that it may be installed in existing homes or buildings to be used as a supplement to the existing cooling and heating system for the purpose of saving energy or it may be used as an independent system under favorable climatic conditions. This system will produce heating or cooling at a fraction of the cost that it takes to operate the conventional air conditioning and heating system. It is best suited to localities where there is an abundance of sunshine but will operate in other localities with a reduced degree of efficiency depending on the amount of sunshine and other climatic conditions.

Operation

While the manner in which the subject system is used and operates is believed to be obvious, it is briefly described as follows when used for heating, evaporative cooling and nocturnal radiation cooling:

Heating

When heating, sunshade 49 is retracted and heat trap 23 is positioned over heat exchanger 14. Water pump 35 is deactivated and blower 27 is in operation. Air is withdrawn from premises 10 through inlet 28 of blower 27 and passed through duct 26 to upper manifold 25. This air then passes downwardly through channels 21 and 22 of both tiers of heat exchanger 14. The air is heated by the latter and after passing into lower manifold 29 is discharged by ducts 30 into premises 10.

Should it be desired to humidify the air as it is being heated, water under pressure is delivered to perforated tube 47. Water drips through the perforations of tube 47 onto the bottoms of channel 22 and some of this water is absorbed by the air to humidify it. Any excess water flows downwardly in channels 22 into small trough or gutter 45. As the latter has a raised center, the water flows in opposite directions from this center to the ends of trough 45 and thence into tubes 46 which carry it to main trough 43. From the latter it is drained into sump 31 by pipe 44.

Evaporative Cooling

For evaporative cooling, heat trap 23 is removed, sun-shade 49 is pulled downwardly into protective position in which it is secured. Water pump 35 and blower 27 are placed in operation as is fan 48 if operation of the latter is desired.

Air is withdrawn from premises 10 by blower 27, delivered to heat exchanger 14, passed through the latter, and discharged into premises 10 in exactly the same manner as described above in the section entitled "Heating," but with one noticable exception, and that is that the air is cooled rather than heated by exchanger 14.

This cooling is generated by water from nozzles 42 being sprayed onto the upper surface of corrugated sheet 17 of exchanger 14. Evaporation cools the water down to near wet bulb temperature which in turn cools the surfaces of the heat exchanger. Thus, the air passing through exchanger 14 is indirectly cooled by the evaporation of water. None of this water is absorbed or commingled with the air. It flows downwardly off of the lower edge thereof and into main trough or gutter 43. As the latter may be inclined towards sump 31, the water passes from trough 43 through pipe 44 into sump 31 from whence it is recirculated. The humidifying apparatus described above in the "Heating" section may also be used with evaporative cooling when the relative humidity is too low.

Under many climatic conditions, temperatures during nighttime are much lower than during the daytime. The wet bulb temperature may drop as much as 10° to 12° which greatly increases the cooling capacity of the system. At the same time, the heat load of the premises drops to about one-third of that during the day. If the subject system is used to supplement an installed air conditioning system, it usually can take over the entire nighttime load.

Nocturnal Radiation Cooling

Night cooling may also be accomplished by the phenomenon known as nocturnal radiation wherein heat from the exchanger is radiated to the night sky. When the exchanger is being used for night cooling, sunshade 49 is retracted at nightfall and water pump 35 is deactivated as is blower 27. As the air in the exchanger is cooled it will flow downward by gravity and be discharged into premises 10 and at the same time air will be withdrawn from the premises through duct 26 and recirculated. This gravity flow of air through the exchanger eliminates the use of any power.

Thus it is evident that the solar collector heat exchanger may be used to produce two forms of cooling, namely, evaporative cooling and nocturnal radiation cooling. The two methods may be used separately or at night simultaneously for their combined cooling effect. By operating the subject system all night, excess cold will be stored in the walls, ceiling, floors, etc., thereby reducing the cooling load required for the next day. Also, ducts, bypasses and valves may be arranged for storing excess cold or heat in suitable bins filled with rock, brick or other materials to permit delayed circulation when the heat or cold is needed.

The instant solar heating and cooling system is unique in many ways and presents many advantages which are cataloged as follows:

First, this new design incorporates a combined solar collector and heat exchanger, indirect evaporative cooler, and nocturnal radiation cooler all in one heat exchanger surface, to wit, that of corrugated sheet 17. Referring to FIG. 3, it can be seen that the arrangement and construction of the corrugated sheets 17 and 19 and flat sheet 18 is such that heat from top sheet 17 is conducted to sheets 18 and 19 and thence to the air flowing through channels 21 and 22.

In the case of cooling, heat from the premises air passes into sheets 17, 18, and 19 and then through top sheet 17 to cold water and is dissipated by evaporation. In this way the area of the effective heat exchange surface is increased as compared to the usual flat plate collector by the surface of the lower sheet 19. This arrangement of stacking surface on surface makes it possible to use less area of roof surface as compared to a flat plate collector. Also, the volume of air passing through the exchanger is doubled over any exchanger using only one corrugated sheet.

The area of the heat exchanger surface and the efficiency may be increased by adding fins 54 such as shown by broken lines at 54 in FIG. 3, to the channels 21 and 22 or to intermediate sheet 18, or the efficiency and air volume may be increased by constructing the exchanger with multiple tiers in excess of two.

Second, since the air of the premises is heated or cooled directly through the heat exchanger 14, no heating or cooling coils are required as in water circulating systems.

Third, as the instant system does not require the use of any water during the winter heating season, the problem of freezing is eliminated.

Fourth, in the subject system the same surface is used in the evaporation of water as in collecting solar heat.

Fifth, this system can be installed in an existing house without disturbing the existing heating or cooling system or without the need of tying into it. It can also be installed in a new house as an independent system or as a supplement to the conventional heating and cooling system. Its manifolding may be designed to fit around and accommodate to normal roof rafters. It also may be mounted on a flat roof as illustrated in FIG. 1a.

Sixth, the spray system of pipes 39 and 40 is protected from direct sunshine by sunshade 49, which may be operated by hand or by an electric drive.

Seventh, the capacity of this system depends on several factors, namely, 1) the area of the solar collector heat exchanger surface: 2) the wet and dry bulb temperatures; 3) the number of hours of sunshine and 4) the construction of the building.

The instant system does not require automatic controls; only on and off buttons to the blower and pump. When being used to supplement and existing heating and cooling system it requires no automatic controls or tie-ins. While in the heating season the system is turned on during sunshine hours and supplies heat to the rooms simultaneously with the existing system. When the room temperature reaches the thermostat setting of the existing system, then that system turns off and this system continues to deliver heat until turned off, if the room becomes too warm. But, if the room temperature drops too low, the thermostat turns the conventional system on again.

In a like manner, the indirect evaporative cooling system and/or the nocturnal radiation cooling system may operate simultaneously with a conventional system without use of automatic controls, however, automatic controls may be used either in heating or cooling if additional control flexibility is desired, and with the humidifyer if desired.

While preferred specific embodiments are herein disclosed, it is to be clearly understood that the invention is not to be limited to the exact constructions, mechanisms and devices illustrated and described because various modifications of these details may be provided in putting the invention into practice.

What is claimed is:

1. In a solar heating and cooling system intended for installation in premises to heat or cool the air therein, said premises including a roof and supporting structure therefore,
   a. a solar collector and heat exchanger including a flat metallic sheet and a grooved metallic sheet secured to said flat sheet to provide a plurality of longitudinal channels which have a vertical component when said exchanger is mounted on said roof;
   b. an upper manifold communicating with said channels at the upper ends thereof;
   c. a duct depending from said upper manifold and extending into said premises;
   d. an air blower within said premises connected to said upper manifold;
   e. a lower manifold communicating with said channels at the lower ends thereof;
   f. a duct depending from said lower manifold and having a discharge end in said premises;
   g. a heat trap in the form of a flat transparent sheet removably mounted on said heat exchanger;
   h. an arrangement of spray pipes mounted above said heat exchanger in spaced relation and substantially parallel thereto;
   i. a source of water;
   j. means for introducing water under pressure from said source into said spray pipes, and,
   k. a retractable sunshade mounted on said roof over said arrangement of spray pipes in a position substantially parallel to said exchanger;

whereby said sunshade may be retracted into a position exposing the upper surface of the grooved sheet of the heat exchanger to rays of the sun and the heat trap positioned over said heat exchanger for heating purposes or the heat trap removed from position covering said heat exchanger and the sunshade extended into position protecting said arrangement of spray pipes and exchanger for cooling purposes.

2. The solar heating and cooling system of claim 1 in which said grooved sheet is a corrugated sheet presenting longitudinal corrugations.

3. The solar heating and cooling system of claim 2 in which the heat exchanger includes a second corrugated sheet secured to the side of said flat sheet on the face thereof opposite to the face to which said first mentioned corrugated sheet is secured whereby two tiers of longitudinal channels are provided, there being an upper tier on the upper side of the flat sheet and a lower tier on the lower side of the flat sheet.

4. The solar heating and cooling system of claim 1 in which a second duct depends from said lower manifold with the two ducts depending from the lower manifold being located at opposite ends thereof.

5. The solar heating and cooling system of claim 1 in which the duct which depends from the upper manifold has its upper end connected to the center of said upper manifold.

6. The solar heating and cooling system of claim 1 together with a water sump mounted on said roof below the lower end of said heat exchanger with said water source communicating with the sump and a main transverse trough just below the top surface of said heat exchanger at the lower end thereof to receive water sprayed onto said top surface, and a pipe extending between said main trough and said sump.

7. The solar heating and coolihg system of claim 6 in which the sump is located at one side of the heat exchanger, with the means for introducing water under pressure to said arrangement of spray pipes taking the form of a water pump, a pipe extending from said sump to said pump, and a pipe upstanding from said pump and having its upper end connected to said arrangement of spray pipes.

8. The solar heating system of claim 7 in which the arrangement of spray pipes comprises a plurality of longitudinal pipes having spray nozzles on the undersides thereof, and a cross pipe communicating with said longitudinal pipes having one end connected to said pipe which upstands from said water pump.

9. The solar heating and cooling system of claim 1 in which the retractable sunshade is rolled on a spring-biased shaft above the upper end of the heat exchanger together with means at the lower end of the heat exchanger to secure the sunshade in an extended protective position.

10. The solar heating and cooling system of claim 1 together with means for introducing humidifying water into the upper ends of the channels of the heat exchanger.

11. The solar heating and cooling system of claim 10 together with means for collecting water from said humidifying means in excess of that used in humidification and transferring the water so collected to a sump on said roof below the lower end of said heat exchanger.

12. The solar heating and cooling system of claim 1 together with a fan mounted on said roof adjacent to said heat exchanger and directed towards water spray.

* * * * *